(12) United States Patent
Lu

(10) Patent No.: US 6,347,254 B1
(45) Date of Patent: *Feb. 12, 2002

(54) PROCESS FACILITY CONTROL SYSTEMS USING AN EFFICIENT PREDICTION FORM AND METHODS OF OPERATING THE SAME

(75) Inventor: Z. Joseph Lu, Glendale, AZ (US)

(73) Assignee: Honeywell INC, Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,433

(22) Filed: Dec. 31, 1998

(51) Int. Cl.[7] .............................................. G05B 13/02
(52) U.S. Cl. .......................................... 700/29; 700/45
(58) Field of Search .............................. 700/45, 44, 29, 700/32

(56) References Cited

U.S. PATENT DOCUMENTS

| | | | |
|---|---|---|---|
| 4,006,346 A | * 2/1977 | Pemberton | 700/39 |
| 4,319,320 A | 3/1982 | Sato et al. | 700/45 |
| 4,481,457 A | 11/1984 | Zach et al. | 318/803 |
| 4,736,316 A | 4/1988 | Wallman | 700/29 |
| 4,745,758 A | 5/1988 | Putman et al. | 60/676 |
| 4,855,896 A | 8/1989 | Oho et al. | 700/9 |
| 5,161,110 A | 11/1992 | Dorchak | 700/108 |
| 5,347,447 A | * 9/1994 | Kiji et al. | 700/32 |
| 5,351,184 A | 9/1994 | Lu et al. | 700/45 |
| 5,369,345 A | 11/1994 | Phan | 318/561 |
| 5,408,406 A | * 4/1995 | Mathur et al. | 700/29 |
| 5,481,456 A | 1/1996 | Ogura | 701/1 |
| 5,486,995 A | 1/1996 | Krist | 700/29 |
| 5,532,922 A | * 7/1996 | Wacker et al. | 700/32 |
| 5,535,117 A | * 7/1996 | Hiroi | 700/38 |
| 5,561,599 A | 10/1996 | Lu | 700/44 |
| 5,572,420 A | 11/1996 | Lu | 700/33 |
| 5,574,638 A | 11/1996 | Lu | 700/45 |
| 5,691,895 A | 11/1997 | Kurtzberg et al. | 700/29 |
| 5,740,033 A | 4/1998 | Wassick | 700/29 |
| 5,992,383 A | * 11/1999 | Scholten et al. | 123/399 |
| 6,055,483 A | * 4/2000 | Lu | 702/31 |
| 6,122,555 A | * 9/2000 | Lu | 700/9 |

FOREIGN PATENT DOCUMENTS

| | | |
|---|---|---|
| DE | 37 15 437 A | 11/1987 |
| EP | 0 275 664 A1 | 7/1988 |
| EP | 0 433 461 A1 | 6/1991 |
| EP | 0 710 902 A1 | 5/1996 |

* cited by examiner

Primary Examiner—William Grant
Assistant Examiner—Edward F. Gain, Jr.
(74) Attorney, Agent, or Firm—Novakov Davis & Munck

(57) ABSTRACT

Controllers and methods of operating the same are introduced for use with a process facility that includes a plurality of associated processes. An exemplary controller includes circuitry that maintains a range of possible values of at least one measurable characteristic associated with at least one process of the plurality of associated processes, and a processor. The processor is capable of selecting at least one value of the range of possible values from the circuitry in response to one of an input or an output of the at least one process, and generating control data as a function of the selected at least one value of the range of possible values and the input or the output of the at least one process. The controller is capable of using the control data to manage the at least one process.

20 Claims, 6 Drawing Sheets

400

| .9179 | .9093 | .9020 | .8892 | .8680 | .8347 | .7769 | .6587 | .4084 | 0 |
|---|---|---|---|---|---|---|---|---|---|
| .9276 | .9199 | .9137 | .9022 | .8835 | .8541 | .8031 | .6988 | .4780 | 0 |
| .9361 | .9293 | .9238 | .9137 | .8972 | .8713 | .8262 | .7342 | .5393 | .0247 |

| | | |
|---|---|---|
| 1.6005 | .0490 | -1.4299 |
| 1.4591 | .0487 | -1.2958 |
| 1.3434 | .0484 | -1.1860 |
| 1.1301 | .0479 | -.9838 |
| .7829 | .0470 | -.6545 |
| .2374 | .0457 | -.1371 |
| -.7100 | .0434 | .7614 |
| -2.6457 | .0387 | 2.5974 |
| -6.7453 | .0287 | 6.4856 |
| -1.4996 | .0011 | 1.4316 |

PROCESS FACILITY CONTROL SYSTEMS USING AN EFFICIENT PREDICTION FORM AND METHODS OF OPERATING THE SAME

COPYRIGHT NOTICE

A portion of the disclosure of this patent document (software listings in APPENDIX A) contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights and protection whatsoever.

CROSS-REFERENCE TO RELATED PATENT DOCUMENTS

The present invention is related to that disclosed in (i) U.S. Pat. No. 5,351,184 entitled "Method of Multivariable Predictive Control Utilizing Range Control;" (ii) U.S. Pat. No. 5,561,599 entitled "Method of Incorporating Independent Feedforward Control in a Multivariable Predictive Controller;" (iii) U.S. Pat. No. 5,574,638 entitled "Method of Optimal Scaling of Variables in a Multivariable Predictive Controller Utilizing Range Control;" (iv) U.S. Pat. No. 5,572,420 entitled "Method of Optimal Controller Design of Multivariable Predictive Control Utilizing Range Control" (the "'420 Patent"); (v) U.S. Pat. No. 5,758,047 entitled "Method of Prodess Controller Optimization in a Multivariable Predictive Controller;" (vi) U.S. patent application Ser. No. 08/490,499, filed on Jun. 14, 1995, entitled "Method of Process Controller Opeimization in a Multivariable Predictive Controller;" (vii) U.S. patent application Ser. No. 08/850,288 entitled "Systems and Methods for Globally Optimizing a Process Facility;" (viii) U.S. patent application Ser. No. 08/851,590 entitled "Systems for Generating and Using a Lookup Table with Process Facility Control Systems and Models of the Same, and Methods of Operating Such Systems;" (ix) U.S. patent application Ser. No. 09/137,358 entitled "Controllers that Determine Optimal Tuning Parameters for Use in Process Control Systems and Methods of Operating the Same;" and (x) U.S. patent application Ser. No. 09/224,439, entitled "Systems for Generating and Using a Lookup Table with Process Facility Control Systems and Models of the Same, and Methods of Operating Such Systems" (which application is filed concurrently herewith), all of which are commonly assigned to the assignee of the present invention. The disclosures of these related patents and patent applications are incorporated herein by reference for all purposes as if fully set forth herein.

TECHNICAL FIELD OF THE INVENTION

The present invention is directed, in general, to control systems for process facilities and, more specifically, to control systems, and models and simulations thereof, using an efficient prediction form and methods of operating the same, all for use to optimize process facilities.

BACKGROUND OF THE INVENTION

Presently, process facilities (e.g., a manufacturing plant, a mineral or crude oil refinery, etc.) are managed using distributed control systems. Contemporary control systems include numerous modules tailored to control or monitor various associated processes of the facility. Conventional means link these modules together to produce the distributed nature of the control system. This affords increased performance and a capability to expand or reduce the control system to satisfy changing facility needs.

Process facility management providers, such as HONEYWELL, INC., develop control systems that can be tailored to satisfy wide ranges of process requirements (e.g., global, local or otherwise) and facility types (e.g., manufacturing, refining, etc.). A primary objective of such providers is to centralize control of as many processes as possible to improve an overall efficiency of the facility. Each process, or group of associated processes, has certain input (e.g., flow, feed, power, etc.) and output (e.g., temperature, pressure, etc.) characteristics associated with it.

In recent years, model predictive control ("MPC") techniques have been used to optimize certain processes as a function of such characteristics. One technique uses algorithmic representations to estimate characteristic values (represented as parameters, variables, etc.) associated with them that can be used to better control such processes. In recent years, physical, economic and other factors have been incorporated into control systems for these associated processes. Examples of such techniques are described in U.S. Pat. No. 5,351,184 entitled "Method of Multivariable Predictive Control Utilizing Range Control;" U.S. Pat. No. 5,561,599 entitled "Method of Incorporating Independent Feedforward Control in a Multivariable Predictive Controller;" U.S. Pat. No. 5,574,638 entitled "Method of Optimal Scaling of Variables in a Multivariable Predictive Controller Utilizing Range Control;" U.S. Pat. No. 5,572,420 entitled "Method of Optimal Controller Design of Multivariable Predictive Control Utiliting Range Control" (the "'420 Patent"); U.S. patent application Ser. No. 08/850,288 entitled "Systems and Methods for Globally Optimizing a Process Facility;" U.S. patent application Ser. No. 08/851,590 entitled "Systems and Methods Using Bridge Models to Globally Optimize a Process Facility;" and U.S. patent application Ser. No. 09/137,358 entitled "Controllers that Determine Optimal Tuning Parameters for Use in Process Control Systems and Methods of Operating the Same," all of which are commonly owned by the assignee of the present invention and previously incorporated herein above by reference for all purposes.

Generally speaking, one problem is that conventional efforts, when applied to specific processes, tend to be non-cooperative (e.g., non-global, non-facility wide, etc.) and may, and all too often do, detrimentally impact the efficiency of the process facility as a whole. For instance, many MPC techniques control process variables to predetermined set points. Oftentimes the set points are a best estimate of a value of the set point or set points. When a process is being controlled to a set point, the controller may not be able to achieve the best control performances, especially under process/model mismatch.

To further enhance the overall performance of a control system, it is desirable to design a controller that deals explicitly with plant or model uncertainty. The '420 Patent, for example, teaches methods of designing a controller utilizing range control. The controller is designed to control a "worst case" process. An optimal controller for the process is achieved and, if the actual process is not a "worst case process," the performance of the controller is better than anticipated.

There are a number of well known PID "tuning" formulas, or techniques, and the most common, or basic, PID algorithm includes three known user specified tuning parameters $(K, \tau_1, \tau_2)$ whose values determine how the controller will behave. These parameters are determined either by trial and error or through approaches that require knowledge of the process. Although many of these approaches, which are commonly algorithms, have provided improved control, PID controller performance tuned by such algorithms usually degrades as process conditions change, requiring a process engineer, or operator, to monitor controller performance. If controller performance deteriorates, the process engineer is required to "re-tune" the controller.

Controller performance deteriorates for many reasons, although the most common cause is changing dynamics of the process. Since PID controller performance has been related to the accuracy of the process model chosen, a need exists for PID controllers that allows for such uncertainty by accounting for changing system dynamics. Further, the requirement for ever-higher performance control systems demands that system hardware maximize software performance. Conventional control system architectures are made up of three primary components: (i) a processor, (ii) a system memory and (iii) one or more input/output devices. The processor controls the system memory and the input/output ("I/O") devices. The system memory stores not only data, but also instructions that the processor is capable of retrieving and executing to cause the control system to perform one or more desired functions. The I/O devices are operative to interact with an operator through a graphical user interface, and with the facility as a whole through a network portal device and a process interface.

Over the years, the quest for ever-increasing process control system speeds has followed different directions. One approach to improve control system performance is to increase the rate of the clock that drives the system hardware. As the clock rate increases, however, the system hardware's power consumption and temperature also increase. Increased power consumption is expensive and high circuit temperatures may damage the process control system. Further, system hardware clock rate may not increase beyond a threshold physical speed at which signals may be processed. More simply stated, there is a practical maximum to the clock rate that is acceptable to conventional system hardware.

An alternate approach to improve process control system performance is to increase the number of instructions executed per clock cycle by the system processor ("processor throughput"). One technique for increasing processor throughput calls for the processor to be divided into separate processing stages. Instructions are processed in an "assembly line" fashion in the processing stages. Each processing stage is optimized to perform a particular processing function, thereby causing the processor as a whole to become faster. There is again a practical maximum to the clock rate that is acceptable to conventional system hardware.

Since there are discernable physical limitations to which conventional system hardware may be utilized, a need exists broadly for an approach that decreases the number of instructions required to preform the functions of the process control system. A need exists for such an approach that accounts for process uncertainty by accounting for changing process dynamics.

SUMMARY OF THE INVENTION

To address the above-discussed deficiencies of the prior art, it is a primary object of the present invention to provide controllers and methods of operating the same in connection with a lookup array or table to further optimize a process control system, as well as models or simulations of the same.

In accordance with an exemplary embodiment discussed with reference to U.S. patent application Ser. No. 09/224,439, entitled "Systems for Genraating and Using a Lookup Table with Process Facility Control Systems and Models of the Same, and Methods of Operating Such Systems" which application is filed concurrently herewith, a lookup array is defined and populated in response to the needs of a controller. The lookup array is populated with a range of possible values of at least one measurable characteristic associated with one or more processes of the process facility and in accordance with a model of at least a portion of the same.

Rather than calculate and re-calculate certain characteristics associated with the process, or a process model, which would consume significant system resources, the controller introduces a data structure capable of maintaining a range of possible values of one or more of such certain characteristics. An exemplary controller in accordance herewith may include circuitry that maintains a range of possible values of at least one measurable characteristic associated with at least one process of the plurality of associated processes, and a processor. The processor is capable of selecting at least one value from the range of possible values from the circuitry in response to one of an input or an output of the at least one process (or process model or simulation), and generating control data as a function of the selected at least one value of the range of possible values and the input or the output of the at least one process.

The controller is capable of using the control data to manage the at least one process. Use of the lookup array in lieu of execution and re-execution of the instructions for performing characteristic calculations decreases the number of instructions required to preform the functions of the process control system. The lookup array, once suitably populated, accounts for process uncertainty by maintaining the range of possible values, thereby accounting for changing process dynamics.

In accordance with an important aspect hereof, the data structure may be populated and maintained on-line (e.g., at a controller, distributed through a process control system, etc.), off-line (e.g., standalone computer, computer network, etc.), or through some suitable combination of the same. Likewise, the data structure may remain static upon population, be dynamic, or be modifiable, at least in part.

Those skilled in the art will understand that "controllers" may be implemented in hardware, software, or firmware, or some suitable combination of the same, and, in general, that the use of computing systems in control systems for process facilities is known. The phrase "associated with" and derivatives thereof, as used herein, may mean to include, be included within, interconnect with, contain, be contained within, connect to or with, couple to or with, be communicable with, cooperate with, interleave, be a property of, be bound to or with, have, have a property of, or the like; the term "include" and derivatives thereof, as used herein, are defined broadly, meaning inclusion without limitation; and the term "or," as used herein, means and/or.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates a conceptual diagram of an exemplary data structure, a lookup array, shown as a two-dimensional matrix, in FIG. 2 in accordance with the principles of the present invention;

DETAILED DESCRIPTION

Figure 1:
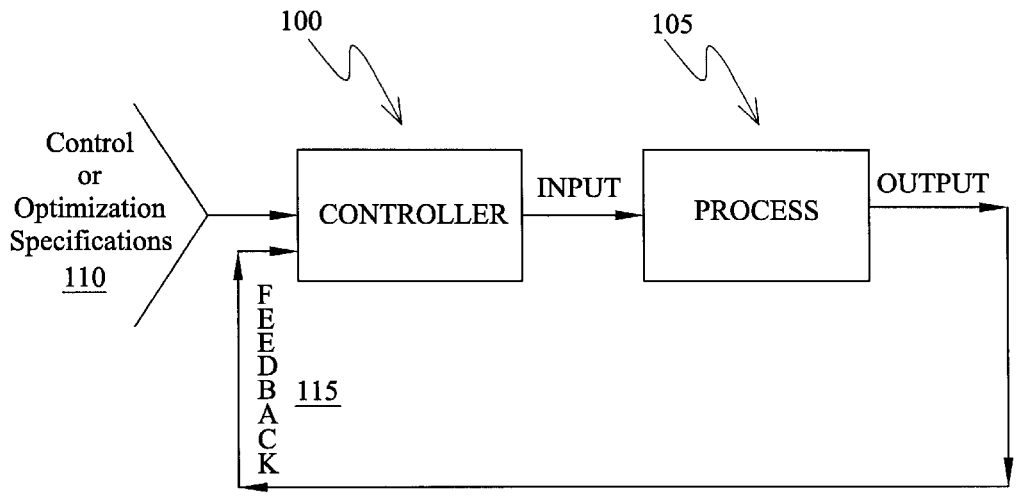
FIG. 1 illustrates a block diagram of an exemplary local controller that may be suitably associated with a particular process or group of associated processes.

Referring initially to FIG. 1, illustrated is a block diagram of an exemplary local controller (generally designated 100) that may be suitably associated with a particular process or group of associated processes (generally designated 105). Exemplary controller 100 uses a single loop multi-variable predictive control ("SL-MPC") structure according to an embodiment of the principles of the present invention. The exemplary SL-MPC structure uses an efficient matrix prediction form and an analytical control solution map to reduce utilization of processing resources relative to conventional MPC technology.

It should be noted that a matrix structure was chosen for the efficient prediction form ("EPF") in this embodiment, however, alternate embodiments may use any appropriate data structure or dedicated circuitry to create a suitably arranged lookup array or table. Such data structures and dedicated circuitry may be populated off-line, on-line or through some suitable combination of the same; likewise, the information maintained in such populated data structures and dedicated circuitry may be static, dynamic, modifiable, centralized, distributed, or any suitable combination of the same. One advantageous approach for populating a suitably arranged data structure is disclosed and described in U.S. patent application Ser. No. 09/224,439, entitled "Systems for Generating and Using a Loopup Table with Process Facility Control Systems and Models of the Same, and Methods of Operating Such Systems," which is filed concurrently herewith and previously incorporated herein by reference for all purposes as if fully set forth herein.

According to the illustrated embodiment, local controller 100 receives as inputs, control/optimization specifications 110 (e.g., bounds, ranges, tolerances, control points, etc.) and feedback data 115 (e.g., output of associated process 105). Control/optimization specifications 110 may be received from any of a number of sources depending upon the associated process or group of associated processes 105, an associated process facility, another controller, or any other factor. For example, any of control/optimization specifications 110 may be received from an operator of a control center for the associated process facility, retrieved from a database or data repository, received from another associated controller (e.g., one or more local controllers, global controllers, or a suitable combination thereof), etc.

Control/optimization specifications 110 include two types of variables: (1) a first variable ("MV") that may be manipulated, such as flow, feed, air blower, etc; and (2) a second variable ("DV") that cannot be manipulated and is a disturbance variable, such as burn rate, fuel quality per unit, etc. Feedback data 115 is a third variable ("CV") that is responsive to MVs and DVs, and is an output of associated process 105, such as pressure, temperature, etc. A sub-variable ("PV") of Feedback Data 115 is indicative of the response of the associated process 105 to monitoring and control by the local controller 100. Many, if not all of such MVs, DVs and CVs represent measurable characteristics of associated process 105 that may be suitably monitored by local controller 100.

Figure 2:
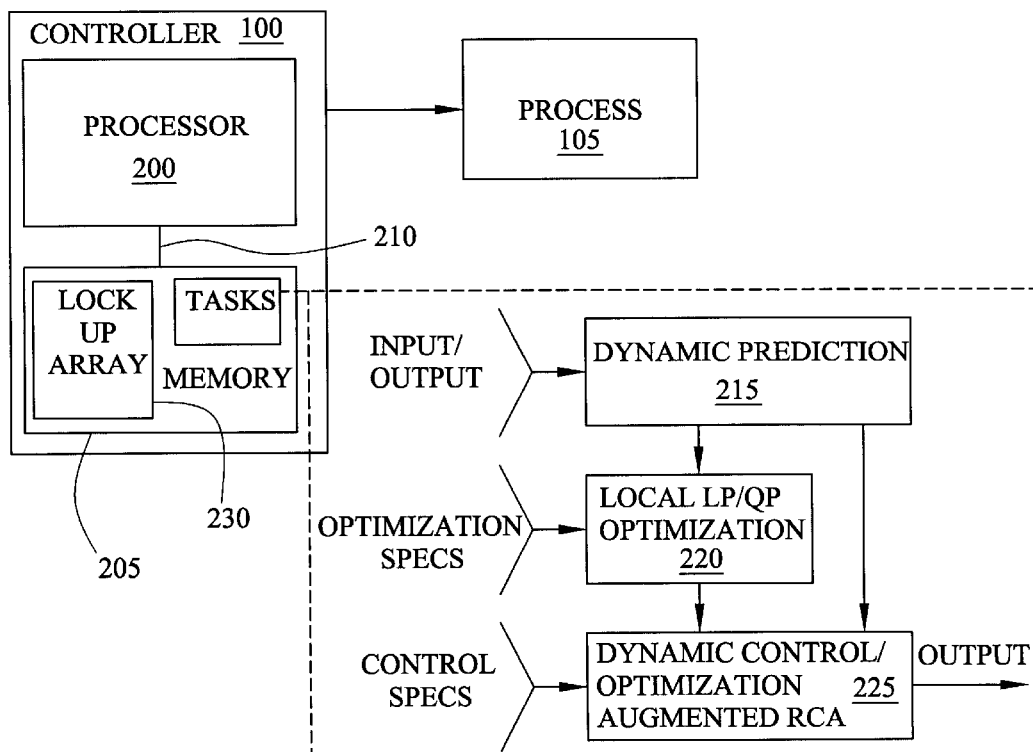
FIG. 2 illustrates a more detailed block diagram of the exemplary local controller introduced with reference to FIG. 1.

Turning next to FIG. 2, illustrated is a more detailed block diagram of exemplary local controller 100, again in association with process (or group of associated processes) 105. Exemplary controller 100 includes a processor 200 and a memory 205, that are connected by a bus 210. Collectively, processor 200, memory 205, and bus 210 form an illustrative processing system, for instance a computer, that is capable of managing process 105.

Exemplary memory 205 illustratively includes a dynamic prediction task 215, a linear program/quadratic program ("LP/QP") optimization task 220, a dynamic control/ optimization augmented range control algorithm ("RCA") 225, and a lookup array 230 that maintains a range of possible values of one or more measurable characteristics, such as for various variables or parameters associated with process 105. An important aspect hereof is recognition that the LP/QP optimization operations of task 220 may suitably provide an analytical solution due to the unity dimension in the LP/QP problem.

Figure 3:
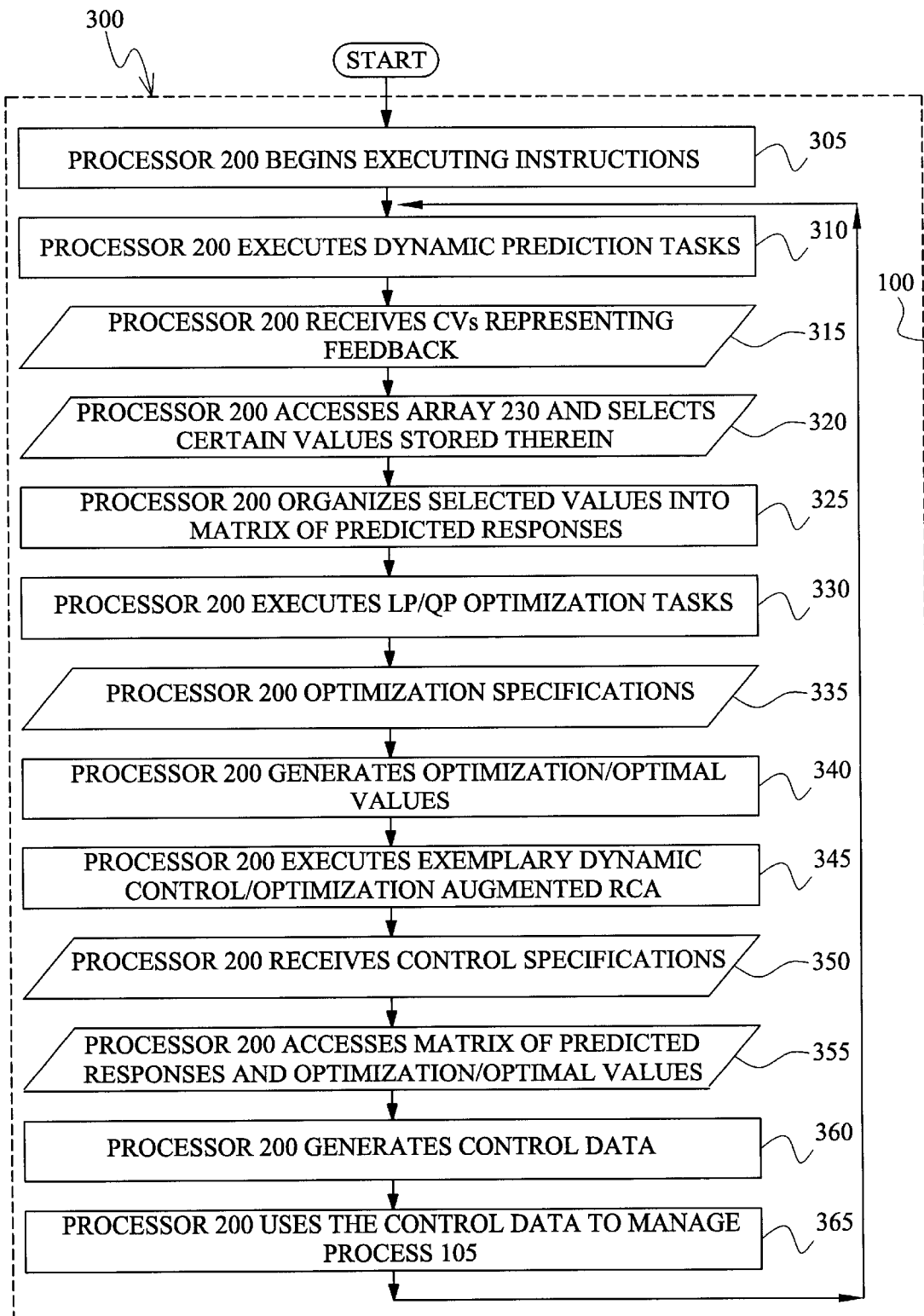
FIG. 3 illustrates a flow diagram of an exemplary method of operating the exemplary local controller of FIGS. 1 and 2 in accordance with the principles of the present invention.

Turning to FIG. 3, illustrated is a flow diagram of an exemplary method (generally designated 300) of operating controller 100 to manage process 105 in accordance with the principles of the present invention. For the purposes of illustration, concurrent reference is made to FIG. 2. An exemplary source code embodiment for using the lookup array 230 is attached as APPENDIX A, and incorporated herein by reference as if fully set forth herein, and that is written in Pascal.

To begin, processor 200 starts executing instructions, causing the SL-MPC structure to manage (e.g., adjust, administer, control, direct, govern, manipulate, master, monitor, oversee, regulate, supervise, or the like) process 105 (process step 305). At a time, to, processor 200 executes exemplary dynamic prediction task 215 (process step 310). Exemplary dynamic prediction task 215 receives CVs (input/output step 315) and operates to generate an array of multiple predictions (or dynamic unforced predictions) and, at 5 tau (response time close to end), an unforced prediction for values associated with associated process 105. The CVs represent feedback data 115 (e.g., inputs, outputs, etc.)

associated with process 105, and dynamic prediction task 215 operates to accesses lookup array 230 and selects one or more values from the range of possible values (input/output step 320), such selection being responsive, at least in part, to the received feedback data 115. Processor 200 advantageously organizes the selected values into a matrix of predictions (or dynamic unforced predictions) and, at 5 tau (response time close to end), an unforced prediction for values associated with process 105 (process step 325).

A preferred method of populating lookup array 230 is disclosed and described in U.S. patent application Ser. No. 09/244,439, entitled "Systems for Generating and Using a Lookup Table with Process Facility Control Systems and Nodels of the Same, and Methods of Operating Such Systems" and filed concurrently herewith, the disclosure of which has previously been incorporated herein by reference for all purposes as if fully set forth herein. Turning momentarily to FIG. 4, illustrated is a conceptual diagram (generally designated 400) of exemplary lookup array 230. With reference hereto, an exemplary process model may suitably be given as follows:

$$G(s) = \frac{1.5}{40s+1} \quad (1)$$

and with PV-blocking equal to [120 125 130] and MV-blocking equal to [1 5 8 13 20 29 41 58 80 110], a step response matrix 400 and a Qmap 405 are shown, noting that if only the current MV move is needed, then QMap1 is equal to [1.6005 0.0490−1.4299]. The exemplary SL-MPC structure of FIG. 1 in combination with the EPF matrix and the analytical control solution map used by processor 100 while executing dynamic prediction task 215 collectively and cooperatively reduce utilization of processing resources relative to conventional MPC technology wherein the predicted unforced responses of the above-given example would have been calculated on-line under the prior art.

Returning to FIG. 3, processor 200 executes exemplary local LP/QP optimization task 220 (processing step 330). LP/QP optimization task 220 operates to receive optimization specifications (input/output step 335) and, in response to the unforced prediction, operates to generate, at 5 tau, optimal values associated with process 105 (process step 340). Most preferably, optimization specifications are associated, directly or indirectly, with an economic value of the output of process 105.

"Processor 200 then executes exemplary dynamic control/optimization augmented RCA 225 (process step 345). Dynamic control/optimization augmented RCA 225 operates to receive control specifications (input/output step 350) and, in response to receiving the array of multiple predictions (from dynamic prediction task 215) and the optimal values (from local LP/QP optimization task 220) (input/output step 355), operates to generate control data, or values (process step 360). Controller 100 uses the control data to manage process 105 (process step 365)."

Stressing an important aspect of the present invention, the foregoing execution of the illustrative tasks 215 to 225, particularly execution of dynamic prediction task 215 using lookup array 230, reduces utilization of processing resources of processor 200. It should be noted that an important aspect of exemplary local controller 100 is the use of control/optimization specifications and feedback data to locally unify economic/operational optimization with MPC dynamically for a specific process or group of processes 105.

Figure 5A:
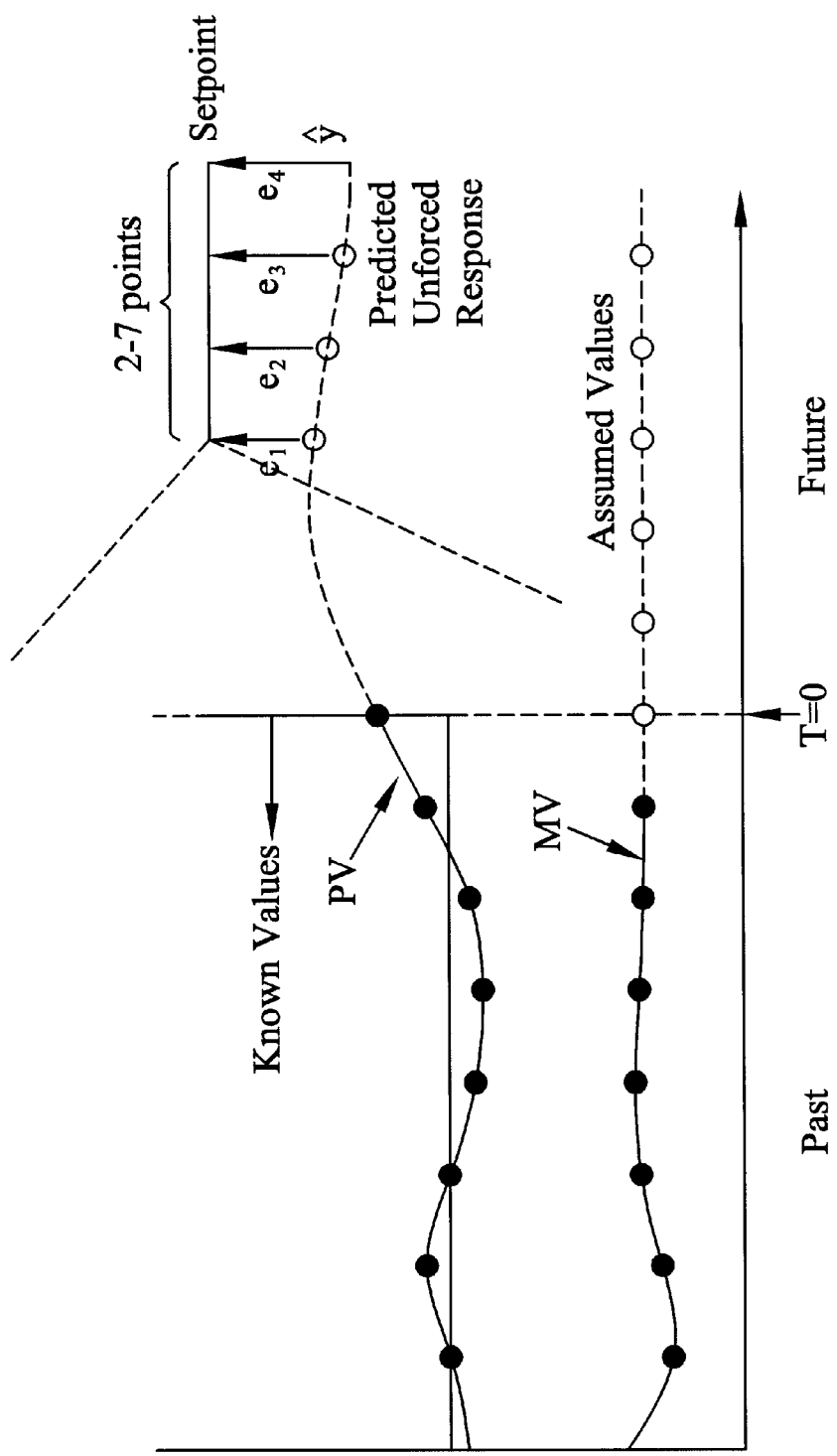
FIGS. 5a and 5b illustrates a pair of two-dimensional graphical models of MV and PV curves in accordance with the principles of the present invention.
Figure 5B:
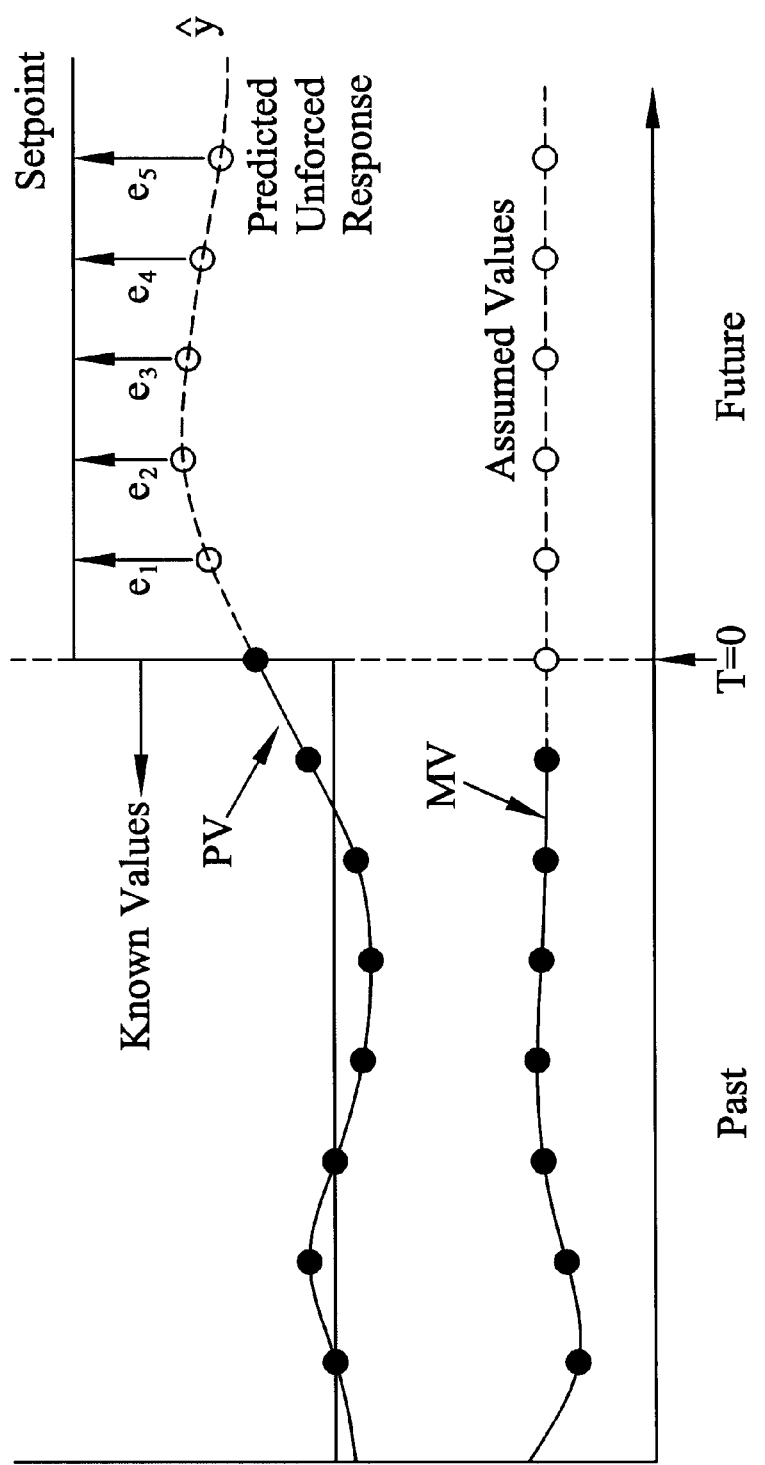

Turning next to FIGS. 5a and 5b, illustrated are a pair of two-dimensional graphical models of MV and PV curves.

FIG. 5a illustrates a modified "funnel" proportional integral and derivative ("PID") response of controller 100 using lookup array 230 in accordance with the principles of the present invention. More precisely, in accord with the EPF, the discrete state space form is given by:

$$x_{k+1} = Ax_k + Bu_k \quad (2)$$

$$y_k = Cx_k + Du_k \quad (3)$$

from which the following may be constructed:

$$z_{k+1} = \begin{bmatrix} A & B \\ 0 & I \end{bmatrix} z_k, \; z_k = \begin{bmatrix} x_k \\ u_k \end{bmatrix} \quad (4)$$

A prediction at any point (p) may be determined by:

$$y_{(k+p)|k} = [C \; D] \begin{bmatrix} A & B \\ 0 & I \end{bmatrix}^p z_k \quad (5)$$

FIG. 5b illustrates an encapsulated MPC using lookup array 230 in accordance with the principles of the present invention. Referring back to the step response matrix 400 and the Qmap 405 introduced with reference to FIG. 4, and according to the illustrative embodiment, it is desirable to have future predictions available, or precalculated, which may suitably be stored as an array of points within lookup array 230. The exemplary matrix for a given PV-blocking is equal to [120 125 130] and for a MV-blocking is equal to [1 5 8 13 20 29 41 58 80 110]. This collection of points may be referred to as PV-blocking, which may be given by the following form for any $p_i$ interval, or point in the future:

$$\hat{Y}(k + pv - blocking)|k = \begin{bmatrix} \hat{y}(k+p_1)|k \\ \hat{y}(k+p_2)|k \\ \vdots \\ \hat{y}(k+p_m)|k \end{bmatrix} \quad (6)$$

wherein i is the index for PV-blocking. The foregoing calculation may suitably be condensed into a product of EPF and $Z_k$, which may be given by:

$$\hat{y}(k+pv-\text{blocking})|k = [EPF]z_k \quad (7)$$

wherein EPF may be given by:

$$[EPF] = \begin{bmatrix} epf_1 \\ epf_2 \\ \vdots \\ epf_m \end{bmatrix} \quad (8)$$

wherein $epf_i$ is independent from the feed back information contained in the Z vector and may therefore be calculated in advance and given by:

$$epf_i = [C \; D] \begin{bmatrix} A & B \\ 0 & I \end{bmatrix}^{p_i} \quad (9)$$

Continuing with the foregoing example, for the same PV-blocking equal to [120 125 130], then epf1 may suitably be equal to [0.9753 0.0247] and epf2 may suitably be said to equal:

$$\begin{bmatrix} 0.0801 & 0.9199 \\ 0.0707 & 0.9293 \\ 0.0623 & 0.9377 \end{bmatrix} \quad (10)$$

Figure 6:
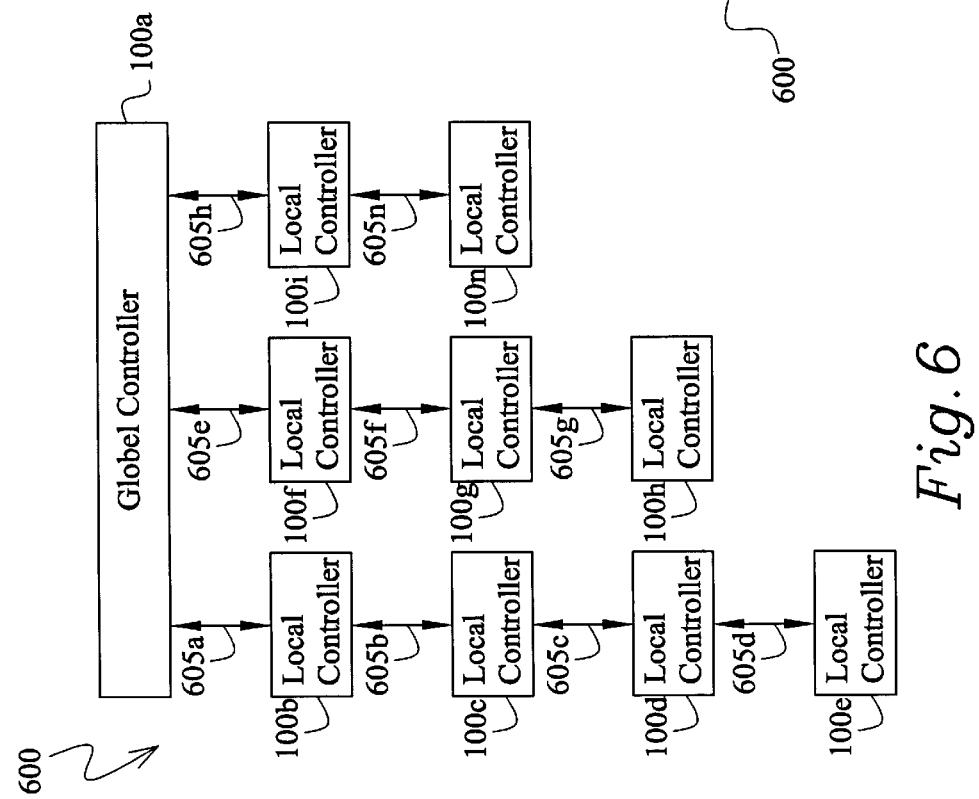
FIG. 6 illustrates a block diagram of exemplary control system that includes a global controller and a plurality of local controllers in accordance with an advantageous embodiment of the present invention.

Turning now to FIG. 6, illustrated is a block diagram of a control system (generally designated 600) that includes a global controller 100a and a plurality of local controllers 100b to 100n (e.g., SL-MPC structure of FIGS. 1 to 3), all in accordance with the principles of the present invention. It is assumed that each of local controllers 100b to 100n is linked, directly or indirectly, to the other controllers and is associated with a process or group of associated processes, for instance, as above-described.

Figure 7:
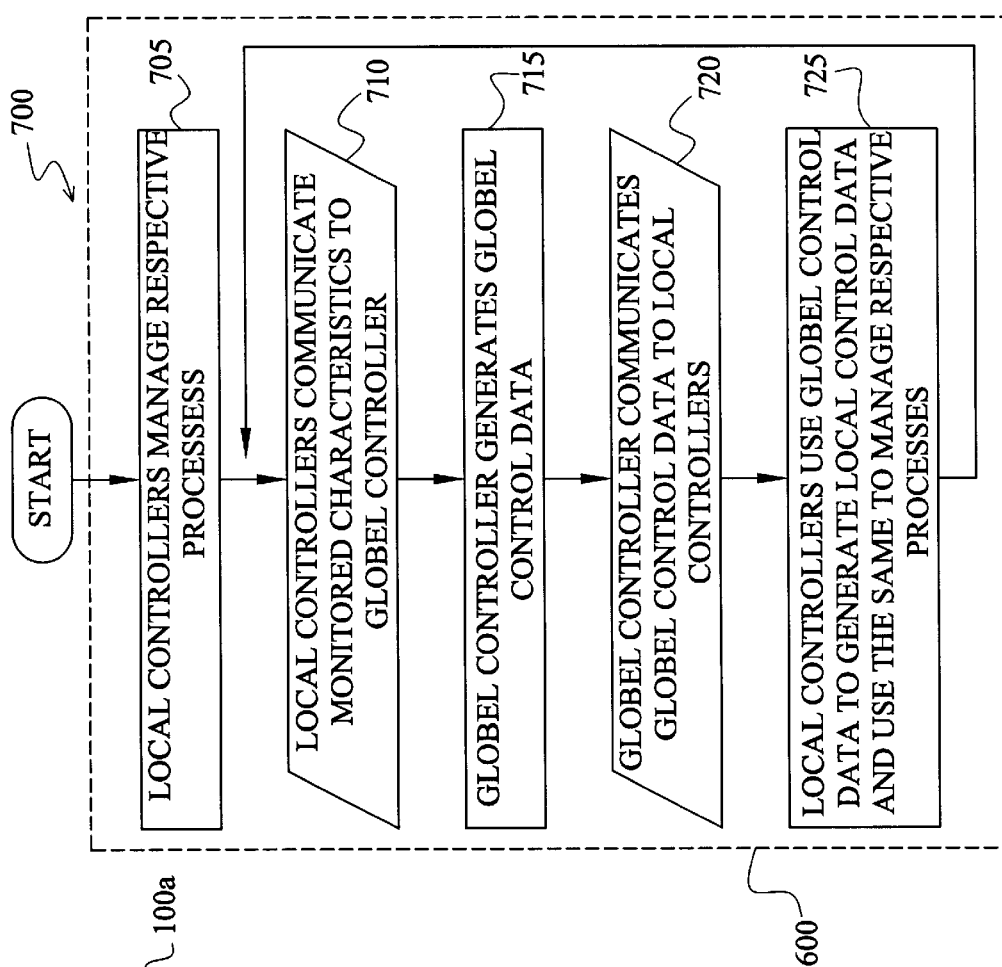
FIG. 7 illustrates a flow diagram of an exemplary method of operating the control system of FIG. 6 to globally optimize a process facility.

According to this embodiment, the controllers continually, and, preferably, dynamically, communicate data between them, including various characteristics of their respective processes. This may be accomplished via conventional communication paths 605a to 605n (e.g., synchronous, asynchronous, etc.). For the purposes of illustration, concurrent reference is made to FIG. 7, which illustrates a flow diagram of an exemplary method (generally designated 700) of operating control system 600 to globally optimize a process facility in accordance with the principles of the present invention.

Exemplary local controllers 100b to 100n begin managing their respective associated processes (process step 705), such as monitoring their respective output, as well as other measurable characteristics thereof, including pressure, temperature, or the like (e.g., CVs). As above-described, local controllers 100b to 100n execute local dynamic prediction tasks that receive such CVs, or feedback data, associated with the managed processes. Preferably, each local controller accesses a local lookup array and selects certain values from a range of possible values of predicted unforced responses stored therein, such selection being responsive to the received feedback data. Local controllers 100b to 100n organize the selected values into a matrix of predictions (or dynamic unforced predictions) and, at 5 tau, an unforced prediction for values associated with their respective processes. Again, an important aspect hereof is recognition that the LP/QP optimization operations thereof may suitably provide an analytical solution due to the unity dimension in the LP/QP problem.

Local controllers 100b to 100n communicate such monitored characteristics to global controller 10a (input/output step 710). Global controller 100a monitors indirectly all processes through local controllers 100b to 100n. In alternate embodiments, of course, global controller 100a may suitably globally monitor one or more of the associated processes directly.

In short, each local controller 125 preferably updates its CV predictions and constraints according to the embodiment of FIGS. 1 to 3, and communicates relevant information, possibly, dynamic predictions, current CV, PV, MV values, status and constraints, objective functions, etc. to global controller 100a, and, possibly, one or more of the other local controllers.

Global controller 100a uses an economic objective function, J, that is equal, at 5 Tau, to a summation of dynamic LP/QP coefficients (linear/quadratic objective functions) of local controllers 100b to 100n, such that:

$$J = LP/QP1 + LP/QP2 + LP/QP3 + \ldots + LP/QPn \quad (11)$$

Global controller 100a generates, in response to such monitored characteristics, global control data ("global data") for dynamically optimizing process facility 100 (process step 715). Global controller 100a combines the multiple dynamically received LP/QP coefficients as set forth above to solve for a global LP/QP (control data according to the illustrated embodiment). Thus, exemplary global controller 100a uses an economic-based optimization parameter, although in alternate embodiments, any suitable at least substantially global (facility-wide) optimization algorithm, procedure, equation or the like may be used. Global controller 100a communicates the global data to local controllers 100b to 100n (input/output step 720). Local controllers 100b to 100n use the global data, at least in part (i.e., to varying degrees), to locally control associated processes, thereby causing the optimization solution to be integrated into each local controller. More specifically, each local controller 100b to 100n executes a local LP/QP optimization task that receives optimization specifications and, in response to the unforced prediction, generate, at 5 tau, optimal values associated with their respective processes. Each local controller 100b to 100n then executes a local dynamic control/optimization augmented RCA that receives control specifications, including the global data, and, in response to receiving the array of multiple predictions (from the local dynamic prediction task) and the local optimal values (from the local LP/QP optimization task), generates local control data, or values. Each local controller 100b to 100n uses the control data to manage their respective processes (process step 725).

The global data provides a global dynamically updated steady state optimization solution for a process facility. This global solution may be used, to varying degrees, by local controllers 100b to 100n to optimize local processes in response to a desired facility-wide optimization solution. Such varying degrees of compliance with the global data may suitably range between compliance and noncompliance with the same. Local controllers 100b to 100n may also dynamically vary their respective degree (range) of compliance.

In point of fact, a particular local controller may have a cooperative association, a direct association, or "Pro-Only" (on your own) association with the global data. In a cooperative association, global controller 100a communicates the global data as MV desired values to the local controller, and the local controller local LP/QP 215 is executed—finding a preferred point that conforms to the communicated MV desired values. This approach may be advantageously used when that which is desirable for each process is also desirable for the facility as a whole. In an advantageous embodiment, global controller 100a solves the steady state dynamic LP/QP optimization globally:

$$\min_{u^{DQP}} QP_1 + QP_2 + \cdots + QP_n \quad (12)$$

(all LP/QP's MV/CV constraints). Local controller 100b to 100n solve the steady state dynamic LP/QP optimization locally:

$$\min_{x_{ss}} \sum (x_{ss_j} - u_j^{DQP})^2 \quad (13)$$

(all PCT's MV/CV constraints), and augments RCA to solve for the optimal path:

$$\min_{x,y} \frac{1}{2} \left\| \begin{bmatrix} W \\ W_o \end{bmatrix} \left( \begin{bmatrix} A \\ S \end{bmatrix} x - \begin{bmatrix} y \\ x_{ss} \end{bmatrix} \right) \right\|_2^2 \qquad (14)$$

(all PCT's MV/CV dynamic constraints).

In a direct association, global controller 100a communicates the global data as MV final values to the local controller, and local controller's local LP/QP 215 is bypassed—local controller 125 takes a directive (MV final values) as the preferred point. This approach may be advantageously used when that which is desirable for each process is not desirable for the facility as a whole. In an advantageous embodiment, global controller 100a solves the steady state dynamic LP/QP optimization globally:

$$\min_{u^{DQP}} QP_1 + QP_2 + \cdots + QP_n \qquad (15)$$

(all LP/QP's MV/CV constraints). The local controller bypasses the steady state dynamic LP/QP optimization locally, and augments RCA to solve for the optimal path:

$$\min_{x,y} \frac{1}{2} \left\| \begin{bmatrix} W \\ W_o \end{bmatrix} \left( \begin{bmatrix} A \\ S \end{bmatrix} x - \begin{bmatrix} y \\ u_k^{DQP} \end{bmatrix} \right) \right\|_2^2 \qquad (16)$$

(all PCT's MV/CV dynamic constraints).

In a Pro-Only association, global controller 100a communicates the control data as operator-specified desired values to the local controllers, and the local controllers' local LP/QP 215 is executed—each local controller 100b to 100n selects a "desired" portion of the control data and disregards an undesired portion of the same. This approach may be advantageously used when cooperative and direct associations are deemed undesirable for the facility as a whole. In a preferred embodiment, global controller 100a solves the steady state dynamic LP/QP optimization globally:

$$\min_{u^{DQP}} QP_1 + QP_2 + QP_n \qquad (17)$$

(all LP/QP's MV/CV constraints). The local controller solves the steady state dynamic LP/QP optimization locally:

$$\min_{x_{ss}} \sum [\alpha_j^u(x_{ss_j} - u_j^{DQP})]^2 + \qquad (18)$$
$$\sum [\alpha_i^y(G_i x_{ss} - y_i^{DQP})^2 + \sum \beta_j^u x_{ss_j} + \sum \beta_i^y G_i x_{ss}$$

(all PCT's MV/CV constraints), and augments RCA to solve for the optimal path:

$$\min_{x,y} \frac{1}{2} \left\| \begin{bmatrix} W \\ W_o \end{bmatrix} \left( \begin{bmatrix} A \\ S \end{bmatrix} x - \begin{bmatrix} y \\ x_{ss} \end{bmatrix} \right) \right\|_2^2 \qquad (19)$$

(all PCT's MV/CV dynamic constraints).

In alternate embodiments, multiple local controllers 100b to 100n may have various static degrees of compliance, or in some combination of the same. In addition, it should be noted that global controller 100a is termed "global" because it monitors all, or at least a substantial number, of associated processes 110, which may be accomplished directly, indirectly, or through a suitable combination thereof. Those skilled in the art should understand that although the functions of global controller 100a have been illustrated as being centralized in the illustrated embodiments hereof, such functionality may be suitably distributed throughout process facility 100. Similarly, local controllers 100b to 100n are termed "local" because each is associated with a specific one or group of associated processes 105, and this is regardless of the physical location or proximity of the local controllers with respect to associated processes 110. Those skilled in the art should therefore also understand that although the functions of local controllers 100b to 100n have been illustrated as being distributed in the illustrated embodiments hereof, such functionality may be suitably centralized somewhere in process facility 100. The functionality of controllers 100a to 100n may be suitably collectively distributed or centralized, or partially distributed and centralized, all depending upon the needs of the process facility to be controlled.

Although the present invention has been described in detail, those skilled in the art should further understand that they can make various changes, substitutions and alterations herein without departing from the spirit and scope of the invention in its broadest form. For instance, it should be noted that the exemplary processing system introduced with reference to FIGS. 2 and 3, which was formed by processor 200, memory 205, and bus 210 may, in alternate embodiments, be replaced by, or combined with, in whole or in part, any other suitable processing circuitry, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), very large scale integrated circuits ("VLSIs"), memory components, systems, or the like, to form the various types of circuitry, controllers and processors described and claimed herein. To that end, conventional circuit design are more fully discussed in *The Art of Electronics,* by Paul Horowitz and Winfield Hill, Cambridge (2nd ed. 1989); conventional principles of processing system architecture and design are more fully discussed in *Computer Organization and Architecture,* by William Stallings, MacMillan Publishing Co. (3rd ed. 1993); conventional processing system network design is more fully discussed in *Data Network Desian,* by Darren L. Spohn, McGraw-Hill, Inc. (1993); and conventional data communications is more fully discussed in *Data Communications Principles,* by R. D. Gitlin, J. F. Hayes and S. B. Weinstein, Plenum Press (1992) and in *The Irwin Handbook of Telecommunications,* by James Harry Green, Irwin Professional Publishing (2nd ed. 1992). Each of the foregoing publications is incorporated herein by reference for all purposes as if fully set forth herein.

ATTORNEY DOCKET No. I20 25207                                    PATENT

APPENDIX A

```
{ System name: Super_PID                        }
{ BEGIN HDR                                     }
{ FILE: /lnk/rmpc/prv/src/sp$calc.s             }
(*:LCN:
%IDNT 04,01;
:LCN:*)
{ DATE: 05/20/98                                }
{ Honeywell Trade Secret - Treat as Honeywell PROPRIETARY }
{ END HDR                                       }

(*:LCN:
{$NoMain}
{$NoPointerCheck}
{$NoList}
%include /lnk/rmpc/prv/src/dqp_data.i.s;
%include /lnk/rmpc/prv/src/mc_lib.i.s;
%include /lnk/rmpc/prv/src/sp_data.i.s;
{$List}
:LCN:*)

{(*:PCHP:}
unit SP_calc;

{$N+,E-      8087 IEEE floating-point, no emulation}
{$A+,B-,G+   Word align, Boolean shortcut, protected mode}
interface
uses sp_data, mc_data, mc_lib {:PC_USE:} , URV_data, ms_data {:};

procedure spidScalc        (    cds                          : sp_cds_data_ptr;
```

-35-

ATTORNEY DOCKET No. I20 25207                                                                 PATENT

```
                              control_mode  : single;
                              var status    : single); {:export_to_DLL:}
```

Implementation
{:PCHP:*)}

(*:LCN:
```
procedure spid$calc (    cds           : sp_cds_data_ptr;
                         control_mode  : single;
                         status        : single;
                         rt_data_ptr   : $address);
                                              external;
:LCN:*)

procedure spidScalc;   (*:FORWARDED:*)
{ Calculate predicted CV values:

-- Calculate committed values out to furthest CV interval used by
                controller (hi_max), with future committed MV values as inputs. The
                committed CV values are the base-line values for the dynamic
                optimization (i.e., the solution values if the independent values
                = 0).

-- Calculate values out to steady-state, with future MV values frozen at
                present values.  The steady-state CV values are the base-line values for
                the steady-state optimization.  }
```

*-36-*

ATTORNEY DOCKET No. I20 25207                    PATENT

```
var
    cJ, k, kp, kp_start, ki, kp_stop, i, j, n_order: integer;
    CDS_ok, y_st_est_local                                          : boolean;
    yt_kp, y_Bias_add, dy_Ramp, dyt0, dy_actual,
    dy_bar, Cur_bias, err, du, y_mid                                : single;

dz   : coef_arrs;

tempout: text;

begin  { sp$calc }
with cds^ do
        begin {first BIG with} n_order := round(n_f[1]);
                { Initialize when point is activated}
                if initpass <= 1.0 then
                        begin { Initialize }
                                predi_counter := 0.0;    {used as kt for debuging,
                                                  increased when mc_predi is called} for cJ:= 1 to (round(n_dv) + 1) do
                                    um1[cJ] := u[cJ];

for k := 0 to round(max_d_int[1]) do
                                    dys[k] := 0; {init stored dy predictions} for i := 1 to round(n_F[1]) do{initialize the states}
                                    begin
```

-37-

ATTORNEY DOCKET NO. I20 25207  PATENT

```
                        dx[i] := 0.0;
                         z[i] := 0.0;
                end;

z[round(n_F[1])+1] := 0.0;

y_UFP[0]:=y;
         y_UFP0 := y;
         y_hat :=  y;

for i := round(y_num_start) to round(y_num_blk) do {Init y_UFP}
               y_UFP[i] := y;

{    y_state_est   := 1;  } { 1=> on, -1=> off, 0 => y_type, 2=> on(manual)}
  {         y_last := y;      }
           y_Filt_Bias := 0;   {y_est must always be good, = y if y is good}
           y_Filt_Ramp := 0;
           y_Filt_Ramp2:= 0;

if badval(y) then
                y_last_BAD := 1.0e8 {y_UFP[0] is JUNK, remove its
                             contribution in y_bias init}
           else
                y_last_BAD := 0.0;

end;   {End of initialization } end; {first BIG with}
```

-38-

ATTORNEY DOCKET No. I20 25207            PATENT

```
{calling sanity check from withing the "BIG with" causes problems in DLL, I dunno why}
{KYS - uncomment later}
{   CDS_ok := sp_consistency_check(csd, status);
}

CDS_ok := true;

with cds^ do
        begin       {BIG with}
                if CDS_ok then {only check once per activating the point}
                {SKIP REST OF ROUTINE IF CDS_ok is false}
                    begin {CDS_ok}
            {   replaced by initpass
                        if predi_counter < 1e8 then
                                predi_counter := predi_counter + 1.0;   }{used as kt for debuging,
                                        increased when mc_predi is called}

(*
{ ----------- Starting the normal FF disturbance Prediction ------------------} dy_bar := 0.0;   {initializing} for cJ := n_mv+1 to (n_mv+n_dv) do
                                begin  { computations for a subprocess } new code using EPF1 and EPF2 end;   { computations for a subprocess }

*)
```

-39-

ATTORNEY DOCKET NO. I20 25207                                                    PATENT

{------------------ Feedback Prediction for CV[I] ------------------}

```
              for k := round(max_d_int[1]) downto 1 do
                      dys[k] := dys[k-1];{shift stored dy predictions. KYS,
                                        JZL, use rotation index} dyt0 := 0.0;   {init}
              for cJ := 1 to (1 + round(n_dv)) do
                      begin  { computations for a subprocess cJ}
                              for i :=1 to round(n_F[cJ]) do {[cJ],
                                        KYS change to array somehow}
                                      begin
                                              dz[i] := dx[i];
                                              dx[i] := 0;
                                              z[i] := z[i] + dz[i];
                                      end;

j := round(n_F[cJ])+1;
                      dz[j] := u[cJ] - um1[cJ];
                      z[j] := z[j] + dz[j];
                      um1[cJ] := u[cJ];

{the last row of epf1 is abandoned}
                      for i :=1 to n_order do {[cJ], KYS change to array somehow}
                              for j := 1 to (n_order+1) do
                                      dx[i] := dx[i] + epf1cds[(n_order+1)*
                                              (i-1) + j] * dz[j];
                      {      dx[i] := dx[i] + pool^.EPF1.mat[i]^[j] * dz[j];
}
```

*-40-*

ATTORNEY DOCKET No. I20 25207                                                                    PATENT

```
                        dys[0] := dx[1];  {store for later use}
                        dyt0 := dyt0 + dys[round(d[cJ])];   {dys needs to be
                                                             expanded for DVs}
                end; { computations for a subprocess cJ}

{Predicted value of y(k) w/o bias correction}
                yt_kp := y_UFP[0] + dyt0;   {=y(0)}
                y_hat := y_hat + dyt0;

for i :=round(y_num_start) to round(y_num_blk) do   {calc ypm}
                {       y_UFP(i) := 0;    difference form, let dy_UFP integrate}
                        begin
                                y_UFP[i] := y_UFP0; {for deviation form}
                                for j := 1 to (n_order+1) do
                                        y_UFP[i] := y_UFP[i] +
                                                epf2cds[(n_order+1)*
                                                (i-round(y_num_start)) + j]* z[j];
                        {       y_UFP[i] := y_UFP[i] +
                                        pool^.EPF2.mat[i-round
                                        (y_num_start)+1]^[j] * dz[j]; }
                        end;

{--------------------start to calc bias ------------------------------------}
                { Determine bias value to be used for y(k). }
                if (y_type = 1.0) then
                        begin  {y_last_BAD is reset later !!!}
                                if ( (y_last_BAD = 0.0) and not bad_uncertain_val
                                                (y, y_not_ok) ) then
                                        begin  {y and last_y are good}
                                                {assuming there is no overrun.  Overrun flag
```

*-41-*

ATTORNEY DOCKET No. I20 25207                                                    PATENT

```
                                will work better.}
                        dy_actual := y - y_last;
                y_Filt_Ramp2 := Filt_opt_Const*y_Filt_Ramp2 +
                                (1-Filt_opt_Const)*(dy_actual - dyt0);
                    end;
                y_Filt_Ramp := Filt_opt_Const2*y_Filt_Ramp +
                                (1-Filt_opt_Const2)*y_Filt_Ramp2;
                yt_kp := yt_kp + y_Filt_Ramp;
                y_hat := y_hat + y_Filt_Ramp;
            end;

y_Bias_add := 0;

if not badval(y) and (y_not_OK < 1.5) then
            begin  {y just became good}
                if (y_last_BAD > 1e7) then
                        begin
                                y_UFP[0] := y;   {just in case y_UFP[0] is
                                                    really JUNKY/Bad}
                                y_hat := y;
                                yt_kp := y;   {revisit JZL}
                                y_Filt_Ramp := 0;
                                y_Filt_Ramp2:= 0;
                        end
                   else if (y_last_BAD > 0) then
                        begin
                                y_mid := (y_last_BAD*y + yt_kp)/
                                            (y_last_BAD + 1);
                                y_Bias_add := (y_mid - yt_kp);
                        end;
```

*-42-*

ATTORNEY DOCKET NO. I20 25207                                        PATENT

```
                          y_last_BAD := 0.0;
                end {y just became good}
        else
                begin {y is BAD}
                        y_last_BAD := y_last_BAD + 1.0;
                end;

if not badval(y) and (y_not_OK < 1.5)then
                y_Filt_Bias := (y - yt_kp) - y_Bias_add;

Cur_bias          := (1-Filt_Const)*y_Filt_Bias + y_Bias_add;
        y_Filt_Bias := Filt_Const*y_Filt_Bias;

{---------------- start to correct bias ------------------ }
        yt_kp := yt_kp  + Cur_bias; { Bias correction} if (y_type = 1.0) then   {new cur_bias for those that
                                  did not get y_Filt_Ramp}
                Cur_bias          := Cur_bias + y_Filt_Ramp ; { Bias correction} y_UFP0 := y_UFP0 + Cur_bias; { Bias correction} for i :=round(y_num_start) to round(y_num_blk) do  {Update bias on y_UFP}
                y_UFP[i] := y_UFP[i] + Cur_bias;

if y_type = 1.0 then
                for i :=round(y_num_start) to round(y_num_blk) do
                                       {Update ramp on y_UFP}
                        y_UFP[i] := y_UFP[i] + y_blk[i]*y_Filt_Ramp;
                                {y_blk starts from 1}
```

*-43-*

ATTORNEY DOCKET NO. I20 25207                                                                                    PATENT

```
                y_UFP[0] := yt_kp;    { y(k|k) }
                { Determine bias value } if initpass < 1e8 then
                        initpass := initpass + 1.0;

end; {CDS_ok}

{---------------------start to calculate control moves ----------------}
        if (control_mode = ON) or (control_mode = WARM) then
                begin {control calculation}
                        du := 0;
                        for i := round(y_num_start) to round(y_num_blk) do
                                begin
                                        if y_H < y_UFP[i] then
                                                err := y_H - y_UFP[i]
                                        else if y_L > y_UFP[i] then
                                                err := y_L - y_UFP[i]
                                        else
                                                err := 0.0;
                                        if abs(err) > 0.0 then
                                                du := du + QMapcds[i-round(y_num_start)+1] * err;
                                end;
                        du  := maxr(-abs(du_L), minr(abs(du_H), du));
                        u_0 := maxr(u_L,  minr(u_H, u[1] + du));
                end;    {control calculation}

{(*:PC_ONLY:}
if initpass < 11 then
```

*-44-*

ATTORNEY DOCKET NO. I20 25207                                                                 PATENT

```
                write (' calc', deltasec (startsec):7:2);
                {:PC_ONLY:*)} end;   {BIG with}
end; { sp$calc }

{(*:PCHP:}
END.    {of unit}
{:PCHP:*)}
```

What is claimed is:

1. A controller for use with a process facility that includes a plurality of associated processes, comprising:

circuitry that maintains a range of possible values of at least one measurable characteristic associated with at least one process of said plurality of associated processes; and a processor that (i) selects at least one value of said range of possible values from said circuitry in response to one of an input to said at least one process and an output of said at least one process and (ii) generates control data as a function of said selected at least one value of said range of possible values and said one of said input to said at least one process and said output of said at least one process, said controller capable of using said control data to manage said at least one process;

wherein said circuitry maintains a model of at least a portion of said plurality of associated processes and wherein said model comprises a discrete state space model of the form:

$$x_{k+1}=Ax_k+Bu_k$$

and $$y_k=Cx_k+Du_k$$

where $x_k$ and $u_k$ and $y_k$ represent states of a modeled process and where k is a time period and k+1 is a next time period and where A, B, C, and D respectively represent measurable characteristics of said modeled process at any given time period and wherein said model gives a prediction form for any point p in the future wherein said prediction is of the form:

$$\hat{y}(k+p)|k = [C\ D]\begin{bmatrix} A & B \\ 0 & I \end{bmatrix}^P Z_k$$

where I is an identity matrix and 0 is a null matrix and where $Z_k$ represents a state space vector of the form:

$$Z_k = \begin{bmatrix} x_k \\ u_k \end{bmatrix}.$$

2. The controller set forth in claim 1, wherein said circuitry maintains a range of possible values of a disturbance variable associated with said at least one process.

3. The controller set forth in claim 1, wherein said circuitry maintains statically said range of possible values.

4. The controller set forth in claim 1, further comprising a communications interface that is capable of associating the controller with a network of controllers that are capable cooperatively of managing said process facility.

5. The controller set forth in claim 4, wherein said controller is a local controller and said network includes a global controller that monitors said plurality of associated processes and generates, in response thereto, global data for optimizing said process facility, said local controller capable of receiving at least a portion of said global data via said communications interface and operating, at least in part, in accordance with said global data to control said at least one process, said local controller thereby cooperating with said global controller to optimize said process facility.

6. The controller set forth in claim 1, wherein said model further comprises an array of PV-blocking values for any point in the future, $p_i$, in the form:

$$\hat{y}(k + pv - blocking)|k = \begin{bmatrix} \hat{y}(k+p_1)|k \\ \hat{y}(k+p_2)|k \\ \vdots \\ \hat{y}(k+p_m)|k \end{bmatrix}.$$

7. The controller set forth in claim 6, wherein said model in said circuitry maintains said range of possible values in an array of elements where each element comprises a product of an efficient prediction form (EPF) and $Z_k$ and said array of elements has the form:

$$\hat{y}(k+pv\text{-blocking})|k=[EPF]Z_k$$

wherein [EPF] is given by:

$$[EPF] = \begin{bmatrix} epf_1 \\ epf_2 \\ \vdots \\ epf_m \end{bmatrix}$$

where $epf_i$ is independent from feedback information contained in $Z_k$ and where $epf_i$ is given by:

$$epf_i = [CD]\begin{bmatrix} A & B \\ 0 & I \end{bmatrix}^{p_i}.$$

8. A method of operating a controller for use with a process facility that includes a plurality of associated processes, comprising the steps of:

maintaining a range of possible values of at least one measurable characteristic associated with at least one process of said plurality of associated processes;

selecting at least one value of said range of possible values in response to one of an input to said at least one process and as an output of said at least one process; and generating control data as a function of said selected at least one value of said range of possible values and said one of said input to said at least one process and said output of said at least one process;

maintaining in said controller a model of at least a portion of said plurality of associated processes and wherein said model comprises a discrete state space model of the form:

$$x_{k+1}=Ax_k+Bu_k$$

and $$y_k=Cx_k+Du_k$$

where $x_k$ and $u_k$ and $y_k$ represent states of a modeled process and where k is a time period and k+1 is a next time period and where A, B, C, and D respectively represent measurable characteristics of said modeled process at any given time period and wherein said model gives a prediction form for any point p in the future wherein said prediction is of the form:

$$\hat{y}(k+p)|_k = [CD]\begin{bmatrix} A & B \\ 0 & I \end{bmatrix}^p Z_k$$

where I is an identity matrix and 0 is a null matrix and where $Z_k$ represents a state space vector of the form:

$$Z_k = \begin{bmatrix} x_k \\ u_k \end{bmatrix}.$$

9. The method of operating the controller set forth in claim 8, wherein said maintaining step includes maintaining a range of possible values of a disturbance variable associated with said at least one process in circuitry.

10. The method of operating the controller set forth in claim 8, wherein said maintaining step includes maintaining statically said range of possible values in circuitry.

11. The method of operating the controller set forth in claim 8, further comprising the step of using a communications interface to associate the controller with a network of controllers that are capable of cooperatively managing said process facility.

12. The method of operating the controller set forth in claim 11, wherein said controller is a local controller and said network includes a global controller that monitors said plurality of associated processes and generates, in response thereto, global data for optimizing said process facility, said method of operation further comprising the steps of:

receiving at least a portion of said global data via said communications interface; and operating, at least in part, in accordance with said global data to control said at least one process and thereby cooperate with said global controller to optimize said process facility.

13. The method of operating the controller set forth in claim 8, wherein said maintaining step includes obtaining said range of possible values in said model from an array of PV-blocking values for any point in the future, $p_i$, in the form:

$$\hat{y}(k+pv-blocking)|k = \begin{bmatrix} \hat{y}(k+p_1)|k \\ \hat{y}(k+p_2)|k \\ \vdots \\ \hat{y}(k+p_m)|k \end{bmatrix}.$$

14. The method of operating the controller set forth in claim 13, wherein said maintaining step includes maintaining said range of possible values in an array of elements where each element comprises a product of an efficient prediction form (EPF) and $Z_k$ and said array of elements has the form:

$$\hat{y}(k+pv\text{-blocking})|k=[EPF]Z_k$$

wherein [EPF] is given by:

$$[EPF] = \begin{bmatrix} epf_1 \\ epf_2 \\ \vdots \\ epf_m \end{bmatrix}$$

where $epf_i$ is independent from feedback information contained in $Z_k$ and where $epf_i$ is given by:

$$epf_i = [CD]\begin{bmatrix} A & B \\ 0 & I \end{bmatrix}^{p_i}.$$

15. A controller for use with a process facility that includes a plurality of associated processes, comprising:

circuitry that maintains a range of possible values of a plurality of measurable characteristics associated with at least one process of said plurality of associated processes, at least one of said measurable characteristics represented as a disturbance variable; and a processor that (i) selects at least one value of said range of possible values from said circuitry in response to one of an input to said at least one process and an output of said at least one process and (ii) generates control data as a function of said selected at least one value of said range of possible values and said one of said input to said at least one process and said output of said at least one process, said controller capable of using said control data to manage said at least one process;

wherein said circuitry maintains a model of at least a portion of said plurality of associated processes and wherein said model comprises a discrete state space model of the form:

$$x_{k+1}=Ax_k+Bu_k$$

and $$y_k=Cx_k+Du_k$$

where $x_k$ and $u_k$ and yk represent states of a modeled process and where k is a time period and k+1 is a next time period and where A, B, C, and D respectively represent measurable characteristics of said modeled process at any given time period and wherein said model gives a prediction form for any point p in the future wherein said prediction is of the form:

$$\hat{y}(k+p)|_k = [CD]\begin{bmatrix} A & B \\ 0 & I \end{bmatrix}^p Z_k$$

where I is an identity matrix and 0 is a null matrix and where $Z_k$ represents a state space vector of the form:

$$Z_k = \begin{bmatrix} x_k \\ u_k \end{bmatrix}.$$

16. The controller set forth in claim 15, wherein said circuitry maintains statically said range of possible values.

17. The controller set forth in claim 15, further comprising a communications interface that is capable of associating the controller with a network of controllers that are capable cooperatively of managing said process facility.

18. The controller set forth in claim 17, wherein said controller is a local controller and said network includes a global controller that monitors said plurality of associated processes and generates, in response thereto, global data for optimizing said process facility, said local controller capable of receiving at least a portion of said global data via said communications interface and operating, at least in part, in accordance with said global data to control said at least one process, said local controller thereby cooperating with said global controller to optimize said process facility.

19. The controller set forth in claim 15, wherein said model further comprises an array of PV-blocking values for any point in the future, $p_i$, in the form:

$$\hat{y}(k + pv - blocking)|k = \begin{bmatrix} \hat{y}(k + p_1)|k \\ \hat{y}(k + p_2)|k \\ \vdots \\ \hat{y}(k + p_m)|k \end{bmatrix}.$$

20. The controller set forth in claim 19, wherein said model in said circuitry maintains said range of possible values in an array of elements where each element comprises a product of an efficient prediction form (EPF) and $Z_k$ and said array of elements has the form:

$$\hat{y}(k+pv\text{-blocking})|k = [EPF]Z_k$$

wherein [EPF] is given by:

$$[EPF] = \begin{bmatrix} epf_1 \\ epf_2 \\ \vdots \\ epf_m \end{bmatrix}$$

where $epf_i$ is independent from feedback information contained in $Z_k$ and where $epf_i$ is given by:

$$epf_i = [CD]\begin{bmatrix} A & B \\ 0 & I \end{bmatrix}^{p_i}.$$

* * * * *